Dec. 3, 1963   L. S. INSCHO, JR   3,112,730
LIQUID LEVEL INDICATOR
Filed Nov. 15, 1961

INVENTOR.
Leland S. Inscho, Jr.
BY
*McGrew and Edwards*
ATTORNEYS

_United States Patent Office_

3,112,730
Patented Dec. 3, 1963

3,112,730
LIQUID LEVEL INDICATOR
Leland S. Inscho, Jr., 350 Agate St., Broomfield, Colo.
Filed Nov. 15, 1961, Ser. No. 152,495
7 Claims. (Cl. 116—110)

This invention relates to a liquid level indicator and more particularly to an audible indicator for announcing low levels of fuel in a ground vehicle fuel tank.

Most ground vehicles are conventionally provided with an integral fuel tank and an arrangement which includes a gauge adjacent the driver's compartment intended to indicate the quantity of fuel left in a tank. Most such gauge arrangements, at best, merely provide an estimate between tank-full and tank-empty conditions. Also, many vehicle operators tend to overlook the vehicle instruments and particularly ignore the fuel gauge. Thus there is a rather abrupt surprise by a sputtering engine when the tank runs dry.

Accordingly, it is an object of this invention to provide means adapted to indicate audibly a low liquid level condition in a vehicle fuel tank; which is usable with conventional vehicle fuel tanks without any modification thereof; which is easily manufactured, inexpensive, yet rugged enough to outlast extended use; and which may be installed by the vehicle operator himself without tools or complicated instruction.

Briefly, in one embodiment, a liquid level indicator according to the concepts of this invention includes a light-weight, substantially spherical member or body having a smaller, hard member integrally mounted therein with an exposed portion. The sphere is sufficiently buoyant as to float the arrangement on the surface of the fuel in a tank and the smaller body must have a higher specific gravity so as to be positioned in lowermost floating position. The small member is hard and is capable of producing an audible noise when it contacts the bottom of the tank due to the motion of the liquid in the tank.

Further features and other objects and advantages of audible liquid level indicators according to the concepts of this invention will become apparent to those skilled in the art from a study of the following detailed description with reference to the appended drawings in which like reference numerals are used to designate like parts in the several views. In these drawings.

Figure 1:
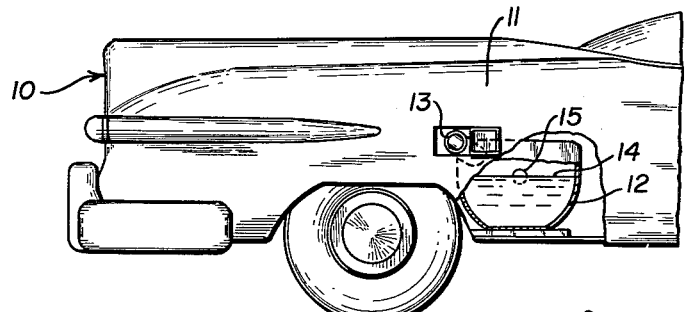
FIG. 1 is a fragmentary view, in partial section, of an automobile and its fuel tank which includes a liquid level indicator according to the concepts of this invention.

In FIG. 1, a rear fragment of an automobile 10 is shown with a portion of its fender 11 broken away to show a sectional view of its fuel tank 12. A supply conduit 13 extends from the top of tank 12 to the atmosphere for filling the tank. A liquid level indicator 15 according to the concepts of this invention is shown in place floating on the surface 14 of fuel in the tank.

Figure 3:
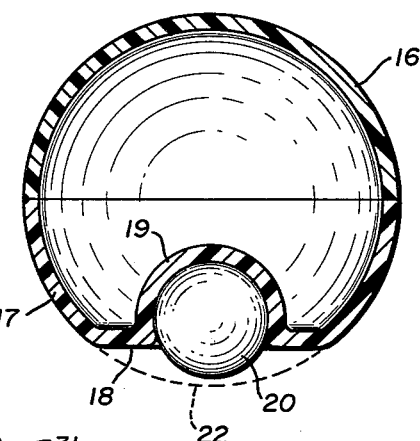
FIG. 3 is a sectional view of the liquid level indicator of FIG. 2.

Preferably, the indicator 15 is a three part assembly including a hollow upper hemispherical shell 16, a lower hollow shell 17 which is not a true hemisphere, but the upper peripheral lip of which is substantially identical in dimension to the lower peripheral lip of shell 16. The surface 18 of shell 17 is flattened and a portion of a small sphere or ball 20 protrudes therefrom. A cup 19 opens through a surface 18, as is best seen in FIG. 3. The cup 19 serves as a nest for the small sphere 20 and is of such dimension as to encompass a major portion of the sphere. The sphere 20 must be of such weight as to remain in the lowest point when the larger ball is floating. Furthermore, the outer peripheral surfaces of the ball 20 are within the extended circumference 22 of shell 17.

In fabrication, the ball 20 is cast in place within the lower shell 17 and shells 16 and 17 are joined by conventional plastic bonding procedures, preferably by a thermal bond. The sections are preferably molded of plastic material such as an acrylic or urethane polymer. The ball 20 is preferably of glass or Lucite material, but may be any hard material which will not spark on contact with the steel or steel alloy fuel tank. Further, although the acrylic or urethane polymers above mentioned are suitable, it should be, however, understood that any material which is compatible with gasoline and oil, i.e., which will not be corroded or react therewith, may be used.

In operation, as the fuel level in a gas tank falls, the liquid level indicator 15 progressively comes closer to the bottom of the tank. Because of the construction of the indicator, the differential weight, and the positioning of the hard ball 20 within the extended diameter 22 of shell 17, any contact between side walls of the fuel tank and the device is with the outer spherical member which will produce no audible sound to a driver. However, when the fuel level becomes low, the sloshing of the fuel remaining in the tank causes the ball 20 to knock or bang against the bottom of the metal tank, thereby providing an audible indication of a low liquid level condition in the fuel tank.

Using the foregoing construction and due to the inherent characteristics of the steel frame and parts of an automobile vehicle when the banging of the ball 20 on the fuel tank occurs, there is transmitted an audible signal which is easily heard by the driver. Many times this results in a quick check of the gauge adjacent the driver and the tank may be refilled with fuel before the tank runs dry. In the case of older vehicles and vehicles in which the indicating system is inoperative, there is sufficient gasoline remaining in the fuel tank when the audible indicator first strikes on the tank as to allow the driver to reach a gasoline service station or the like to obtain additional fuel.

The maximum dimensions of the indicator 15 are sufficiently small to enable insertion down the fuel tank supply conduit or filler tube. Thus, no special tools or complicated instructions are required for installing the liquid level indicator in a vehicle fuel tank.

Figure 2:
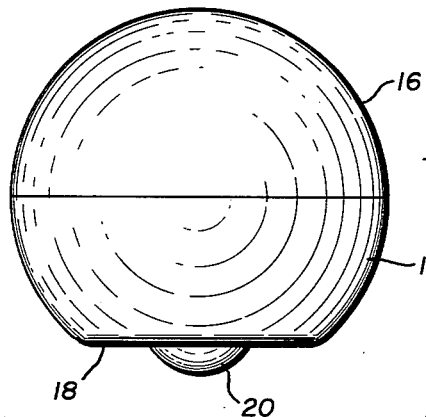
FIG. 2 is an enlarged side elevation of the liquid level indicator of FIG. 1.
Figure 4:
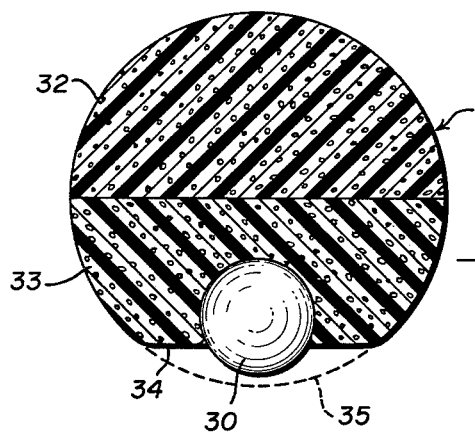
FIG. 4 is a sectional view similar to FIG. 3 of an alternative construction for a liquid level indicator according to the concepts of this invention.

The arrangement of FIG. 4 is an alternative embodiment in which a hard ball or sphere 30 is included in the two-piece buoyant member 31. Member 31 is comprised of a solid hemispherical upper portion 32 fabricated of a lightweight foamed plastic material of similar material impervious to the fuel in which it is to be used. The lower portion 33 is likewise fabricated of a foamed plastic material similar to the upper one but is not a true sphere. The bottom surface 34 is flattened as was the surface 18 of the arrangement of FIGS. 1–3 such that the protruding portion of the ball 30 is within the extended circumference 35 of the lower member 33. This indicator operates in a manner similar in all respects to that above described with reference to the arrangement of FIGS. 1–3. The arrangement of FIGS. 1–3 is preferable since there is less material cost, but the parts of the arrangement of FIG. 4 are easily cast for rapid production procedures. Also, the buoyant member may be cast in one piece about the smaller hard ball.

Having thus described my invention with sufficient particularity and detail as to enable those skilled in the art to practice it, what I desire to have protected by Letters Patent is set forth in the following claims:

1. An audible, liquid level indicator for rigid wall containers, comprising a lightweight, buoyant body, a hard smaller body substantially encompassed by the buoyant body but having a minor portion exposed, said smaller body having a higher specific gravity than said buoyant body, said buoyant body capable of floating on the surface of a liquid with the smaller body in lowermost position, said buoyant body being arranged to strike the wall of its container without audible sound and the exposed minor portion of said smaller body adapted to provide an audible signal when it contacts a bottom wall of a liquid container in which the indicator is placed.

2. A liquid level indicator for rigid wall containers providing an audible signal at a low liquid level, comprising a lightweight, buoyant, substantially spherical body, a hard, smaller, substantially spherical body substantially encompassed by the buoyant body but having a minor portion exposed, said smaller body having a higher specific gravity than said buoyant body, the buoyant body being cabaple of floating itself on the surface of a liquid with said hard body in lowermost position and arranged to strike the walls of the container without audible sound, and the exposed minor portion of the smaller body adapted to provide an audible signal when it contacts a bottom wall of a liquid container in which it is placed.

3. An audible, liquid level indicator for rigid wall containers, comprising a lightweight, buoyant, substantially spherical body having a substantially flat surface in a plane across a minor chord of the body, a hard, smaller, substantially spherical body substantially encompassed by the buoyant body and having a minor portion exposed through said flattened surface, the outer limit of the exposed minor portion being within the limit of an extended circumference of the buoyant body, said buoyant body being constructed and arranged to strike a wall of its container without audible sound, said smaller body having a higher specific gravity than said buoyant body so as to be positioned in lowermost position while floating, and the exposed minor portion of the smaller body adapted to provide an audible signal when it contacts a bottom wall of a liquid container in which it is placed.

4. The indicator of claim 3 in which the buoyant body is comprised of a bonded two-piece shell, the upper shell of which is substantially a true hemisphere and the lower of which has an upper peripheral lip of substantially the same dimension as the lower peripheral lip of the upper shell.

5. The indicator of claim 4 in which the buoyant spherical body is fabricated of a lightweight polymer resistant to corrosion and reaction with liquid fuels.

6. The indicator of claim 5 in which the small spherical body is fabricated of a hard material which does not spark on metal contact.

7. The indicator of claim 3 in which the buoyant spherical body is comprised of a foamed polymer impervious to fuels.

References Cited in the file of this patent

UNITED STATES PATENTS

| | | |
|---|---|---|
| 302,245 | Getchell | July 22, 1884 |
| 1,878,947 | Luff et al. | Sept. 20, 1932 |
| 2,660,194 | Hoffman | Nov. 24, 1953 |

FOREIGN PATENTS

| | | |
|---|---|---|
| 498,555 | Italy | Sept. 30, 1954 |